United States Patent
Christy et al.

(10) Patent No.: US 9,151,273 B2
(45) Date of Patent: Oct. 6, 2015

(54) SOLAR TREE WITH OPTIONAL WIND TURBINE GENERATOR

(71) Applicants: Frank L. Christy, Vero Beach, FL (US); Stephen C. Keiser, Vienna, WV (US); David M. Archer, Lowell, OH (US); Rod Arter, Delaware, OH (US)

(72) Inventors: Frank L. Christy, Vero Beach, FL (US); Stephen C. Keiser, Vienna, WV (US); David M. Archer, Lowell, OH (US); Rod Arter, Delaware, OH (US)

(*) Notice: Subject to any disclaimer, the term of this patent is extended or adjusted under 35 U.S.C. 154(b) by 20 days.

(21) Appl. No.: 13/942,473

(22) Filed: Jul. 15, 2013

(65) Prior Publication Data

US 2014/0021723 A1    Jan. 23, 2014

Related U.S. Application Data

(63) Continuation-in-part of application No. 12/710,331, filed on Feb. 22, 2010, now Pat. No. 8,487,469.

(51) Int. Cl.
| | |
|---|---|
| *F03D 11/00* | (2006.01) |
| *F03D 9/00* | (2006.01) |
| *F03D 11/04* | (2006.01) |
| *H02S 10/10* | (2014.01) |

(52) U.S. Cl.
CPC ............ *F03D 11/0075* (2013.01); *F03D 9/002* (2013.01); *F03D 9/007* (2013.01); *F03D 11/04* (2013.01); *F05B 2240/40* (2013.01); *H02S 10/10* (2014.12); *Y02E 10/725* (2013.01); *Y02E 10/728* (2013.01)

(58) Field of Classification Search
CPC ..... F03D 9/007; F03D 11/04; F03D 11/0075; F03D 9/002
USPC ..................... 290/44, 55; 60/641.8
See application file for complete search history.

(56) References Cited

U.S. PATENT DOCUMENTS

| | | | |
|---|---|---|---|
| 4,200,904 A | | 4/1980 | Doan |
| 5,182,458 A | | 1/1993 | McConachy |
| 5,254,876 A | | 10/1993 | Hickey |
| 5,313,377 A | * | 5/1994 | Kasboske ...................... 362/122 |
| 5,694,774 A | * | 12/1997 | Drucker ...................... 60/641.11 |
| 5,983,634 A | * | 11/1999 | Drucker ........................... 60/398 |
| 6,661,113 B1 | | 12/2003 | Bonin |
| 7,008,171 B1 | * | 3/2006 | Whitworth ..................... 415/4.2 |
| 7,040,858 B2 | | 5/2006 | Suzuki |

(Continued)

FOREIGN PATENT DOCUMENTS

| | | |
|---|---|---|
| JP | 2001295751 | 10/2001 |
| WO | WO2009045349 | 4/2009 |

*Primary Examiner* — Tulsidas C Patel
*Assistant Examiner* — Viet Nguyen
(74) *Attorney, Agent, or Firm* — John L. DeAngelis; Beusse Wolter Sanks & Maire, PPLC.

(57) ABSTRACT

An apparatus for generating electricity. The apparatus comprises a plurality of solar energy collectors for generating electricity from solar energy; a plurality of wind turbines for generating electricity from wind energy; a support structure having arms extending radially from a vertical shaft, the arms positioned at different vertical distances along the vertical shaft and the arms having decreasing lengths in a direction toward a top of the apparatus; solar energy collectors affixed to terminal ends of the arms and disposed at different vertical distances along the vertical shaft, the solar energy collectors shaped and oriented to direct wind streams striking the solar energy collectors toward the wind turbines; and each one of the plurality of wind turbines rotatably supported by the vertical shaft to rotate about the vertical shaft and disposed at different vertical distances along the vertical shaft.

14 Claims, 14 Drawing Sheets

(56) References Cited

U.S. PATENT DOCUMENTS

| Patent/Pub No. | Date | Name | Class |
|---|---|---|---|
| 7,045,702 B2 | 5/2006 | Kashyap | |
| 7,321,173 B2 | 1/2008 | Mann | |
| 7,453,167 B2 | 11/2008 | Gilbert | |
| 7,638,891 B2 | 12/2009 | Fein | |
| 7,737,571 B2 * | 6/2010 | Fein et al. | 290/44 |
| 7,757,490 B2 * | 7/2010 | Kenessey | 60/641.12 |
| 7,821,159 B2 | 10/2010 | Day | |
| 7,824,060 B2 | 11/2010 | Pelken | |
| 7,928,595 B1 | 4/2011 | Gonzalez-Carlo | |
| 8,058,738 B1 * | 11/2011 | Bertz | 290/2 |
| 8,157,501 B2 | 4/2012 | Semov | |
| 8,288,884 B1 * | 10/2012 | Malcolm | 290/55 |
| 8,338,977 B2 | 12/2012 | Lee | |
| 2003/0170123 A1 * | 9/2003 | Heronemus | 416/41 |
| 2003/0230333 A1 | 12/2003 | Kashyap | |
| 2004/0250543 A1 * | 12/2004 | Yeh | 60/641.8 |
| 2005/0045224 A1 | 3/2005 | Lyden | |
| 2005/0230978 A1 * | 10/2005 | McGovern | 290/44 |
| 2007/0090653 A1 * | 4/2007 | Martelon | 290/55 |
| 2007/0287389 A1 | 12/2007 | Pockat | |
| 2008/0116694 A1 | 5/2008 | Hendershot | |
| 2008/0148732 A1 * | 6/2008 | Fein et al. | 60/641.3 |
| 2008/0181777 A1 | 7/2008 | Bailey | |
| 2008/0273974 A1 * | 11/2008 | Becker | 416/7 |
| 2009/0074577 A1 * | 3/2009 | Semov | 416/132 B |
| 2009/0102194 A1 * | 4/2009 | M'Ariza Garcia San Miguel et al. | 290/44 |
| 2009/0244890 A1 | 10/2009 | Pelken | |
| 2009/0261595 A1 * | 10/2009 | Poo | 290/55 |
| 2009/0262525 A1 | 10/2009 | Lai | |
| 2010/0013310 A1 | 1/2010 | Day | |
| 2010/0158673 A1 | 6/2010 | Keene | |
| 2010/0219643 A1 | 9/2010 | Biucchi | |
| 2010/0270806 A1 | 10/2010 | Estrada | |
| 2011/0291424 A1 * | 12/2011 | Lin | 290/1 A |
| 2012/0038160 A1 * | 2/2012 | Chang | 290/50 |
| 2012/0267901 A1 * | 10/2012 | Shufflebotham | 290/1 R |
| 2013/0170949 A1 * | 7/2013 | Samuels | 415/1 |
| 2013/0264829 A1 * | 10/2013 | Jordan, Sr. | 290/55 |

* cited by examiner

SOLAR TREE WITH OPTIONAL WIND TURBINE GENERATOR

CROSS REFERENCE TO RELATED APPLICATION

This patent application is a continuation-in-part application claiming priority to the application filed on Feb. 22, 2010, assigned application Ser. No. 12/710,331 and entitled Solar Wind Tree, (now U.S. Pat. No. 8,487,469), which claims priority to the provisional patent application No. 61/154,390 filed on Feb. 21, 2009, entitled Solar Wind Tree.

FIELD OF THE INVENTION

This invention relates to methods and apparatuses related to a solar electricity generating apparatus and such an apparatus in combination with a wind turbine electricity generating apparatus.

BACKGROUND OF THE INVENTION

Both solar arrays and wind turbines for generating electricity are known, but each has several disadvantageous features primarily due to their large size and unsightly appearance. Although solar panels can be roof-mounted and their appearance somewhat obscured, wind turbines are especially problematic in this regard. They are constructed hundreds of feet from the ground and to generate a maximum amount of electricity the turbine blades are typically several feet across. Thus wind farms, comprising many such wind turbines, are located away from residential and business areas.

BRIEF DESCRIPTION OF THE DRAWINGS

The present invention can be more easily understood and the further advantages and uses thereof more readily apparent, when considered in view of the following detailed description when read in conjunction with the following figures. In accordance with common practice, the various described features are not drawn to scale, but are drawn to emphasize specific features relevant to the invention. Reference characters denote like elements throughout the figures and text.

DETAILED DESCRIPTION OF THE INVENTION

Before describing in detail the particular methods and apparatuses related to a combination solar and wind generating apparatus (i.e., a solar wind tree) it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions. The presented embodiments are not intended to define limits as to the structures, elements or methods of the inventions, but only to provide exemplary constructions. The embodiments are permissive rather than mandatory and illustrative rather than exhaustive.

It would be beneficial to develop a combination wind and solar electricity generating apparatus for maximizing the amount of electricity generated from our natural resources and further having an appearance that is aesthetically pleasing. Such an aesthetically pleasing generating apparatus can be located within a residential or commercial area. With the source of electricity proximate the user of electricity, losses during transmission of the electricity are drastically reduced. The homeowner or business owner can take responsibility and control the generation of electricity for personal/business consumption.

One of the present inventors was suddenly struck by the idea of a solar wind tree while riding on a train just west of Amsterdam in the Netherlands two years ago. He observed the large number of wind turbines already in use and clearly visible from the train.

As the train stopped at a small station the inventor noticed the trees next to the platform and observed the breeze blowing through the trees. He observed that every tree leaf was moving while at the same time nearly every leaf was exposed to the bright sunlight overhead. It occurred to this inventor that if one could capture both the solar energy and wind energy using a "tree" one might be able to maximize the benefit of both forms of environmentally friendly energy.

He then questioned why one could not configure both solar panels and wind turbines in the form of a tree and thus maximize use of both the wind turbines and the solar panels from a single structure. Additionally, such a solar/wind generator in the form of a tree, or another natural or man-made object, can be designed and constructed to be aesthetically pleasing to the eye by incorporating design elements that imitate foliage and soften the visual effects of the "tree."

Figure 1:
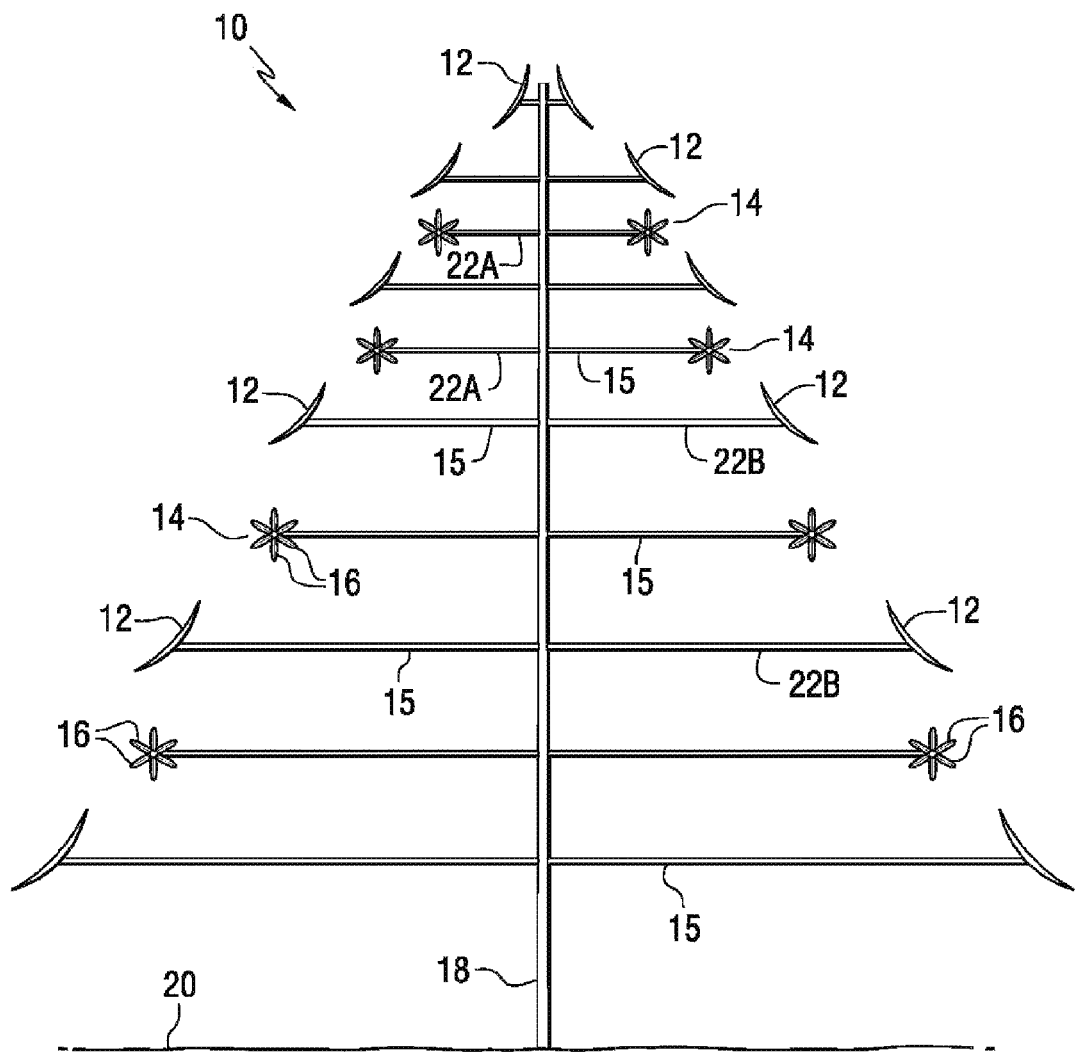
FIG. 1 depicts a cross-section through one embodiment of a solar/wind "tree" of the present invention.

FIG. 1 depicts a cross-section through one embodiment of such a solar/wind "tree" 10 comprising a plurality of solar collectors 12 and wind turbines 14 affixed to arms 15 extending from a central supporting "trunk" or vertical shaft 18 extending from ground 20. Each wind turbine 14, comprising a plurality of substantially vertical wind turbine blades 16, supplies rotational torque to a proximately-mounted generator (not shown, but typically mounted in the same hub or enclosure as the wind turbine, i.e., co-located with the wind turbine) for producing electricity. Generally, the electricity is fed to conductors 22A that extend along the tree "branches" (the arms 15) and may be joined to other conductors that extend along the tree trunk 18. Similarly, electricity generated by the solar collectors 12 is carried over conductors 22B to the trunk 18. The conductors 22A and 22B may be joined or remain separate, the latter to provide two separate sources of electricity.

As illustrated in FIG. 1, the solar energy collectors 12 are disposed at various levels (or vertical heights from the ground) along the "trunk" or vertical shaft 18, with the wind turbines disposed at alternating levels. However, this Figure presents an exemplary embodiment as other configurations are possible for the solar collectors 12 and the wind turbines 14. For example, both collector types can be affixed to the same arm 15.

In the illustrated embodiment the blades 16 of each wind turbine 14 are substantially perpendicular to the ground. Both the blade angle relative to the ground and the blade pitch may be adjustable.

Figure 2:
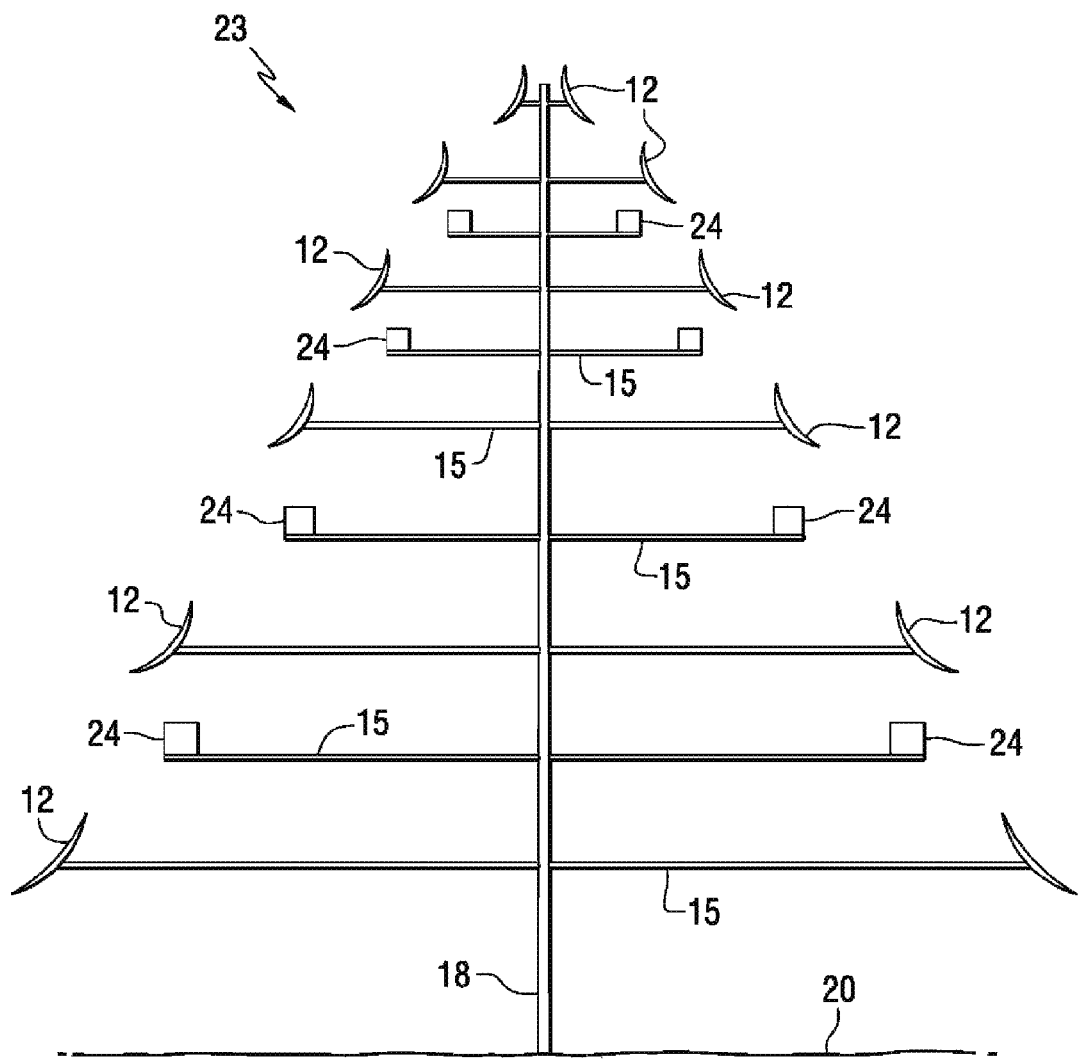
FIG. 2 illustrates a second embodiment of a solar/wind tree according to the present invention.
Figure 16:
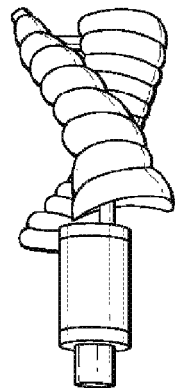
FIG. 16 illustrates a helical wind turbine for use with the present invention.

FIG. 2 illustrates a solar wind tree 23 comprising helical wind turbines, as further depicted in FIG. 16 and available from Helical Wind, Inc. of San Diego, Calif.

In both the embodiments of FIGS. 1 and 2, the orientation of each wind turbine may be fixed or adjustable, with a selected orientation responsive to an expected predominant wind direction and wind velocity.

Also, in the embodiments of both FIGS. 1 and 2, the curvature and angle with respect to the vertical of each solar collector 12 may be fixed or adjustable to take advantage of an expected sun angle at the location of the solar wind tree 10/23. The wind turbines may be disposed on the same arm or "branch" as the solar collectors or on a different branch (as illustrated in FIGS. 1 and 2) if that arrangement is more efficient for capturing the maximum wind velocity. The illustrated embodiments showing alternating wind turbines and solar collectors are merely exemplary.

Taking advantage of the natural shape of a pine tree, for example, the solar/wind tree 10/23 narrows in a direction toward the apex or top so that higher-mounted solar collectors 12 do not obscure the sunlight from lower-mounted collectors 12. In this embodiment the solar collectors are slightly curved to enhance sunlight capture as the sun moves across the sky and to present an airfoil-like structure that directs the wind to the turbines of the solar/wind tree. An airfoil shape is selected to maximize the velocity of the wind striking the wind turbine blades. Other shapes beyond the concave shapes illustrated may be used. The curve of the solar collector may be concave or convex (or substantially flat) depending on the design that optimizes electricity produced by the solar collectors 12 and the wind turbines 14/24.

In another embodiment the orientation of each solar collector 12 is automatically controlled to track the sun as it traverses the sky. For example, the tilt angle (the angle of each solar collector with respect to a vertical line) is controllable to maximize sun exposure. Also, an angle of each blade for each wind turbine 14/24 and the angle of the rotational axis are controllable to optimize the direction at which the wind strikes the blades. For example, the rotational axis may be horizontal as illustrated in FIG. 1, vertical (not shown) or controllable to any angle between horizontal and vertical.

Mechanical devices for tracking the sun and positioning the collector in response thereto are known by those skilled in the art. The solar collectors may also be fixedly oriented to receive optimum solar energy as determined by location of the installation site.

The wind turbines 14/24 each comprise a plurality of blades extending from a rotating drive shaft that turns an electricity-generating generator. The generator may produce alternating or direct current, and operates according to commutation and induction principles as is known to those skilled in the art. The present invention is intended to encompass all types of apparatuses for generating electricity from solar and wind sources.

Figure 3:
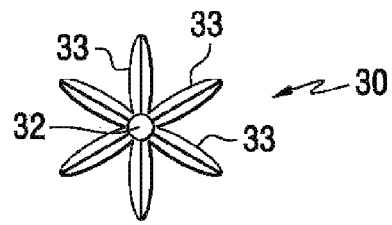
FIG. 3 illustrates a front view of a blade wind turbine.

FIG. 3 illustrates a front view of a turbine blade 30 (with an axis of rotation 32 perpendicular to a plane of the page) and blades 33 extending from the axis of rotation 32.

Figure 4:
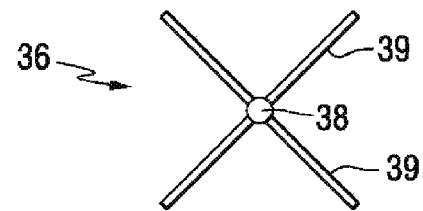
FIG. 4 illustrates a side view of a paddle wheel-like wind turbine.

In another embodiment, a wind turbine comprises a plurality of surfaces each having one edge joined in a radial pattern to a central drive shaft (e.g., a paddle wheel). As the wind strikes the paddles, the drive shaft turns and drives the electrical generator connected thereto. FIG. 4 illustrates a side view of a paddle wheel-like propeller 36 with an axis of rotation 38 (perpendicular to a plane of the page) and plurality of paddles 39.

Figure 5:
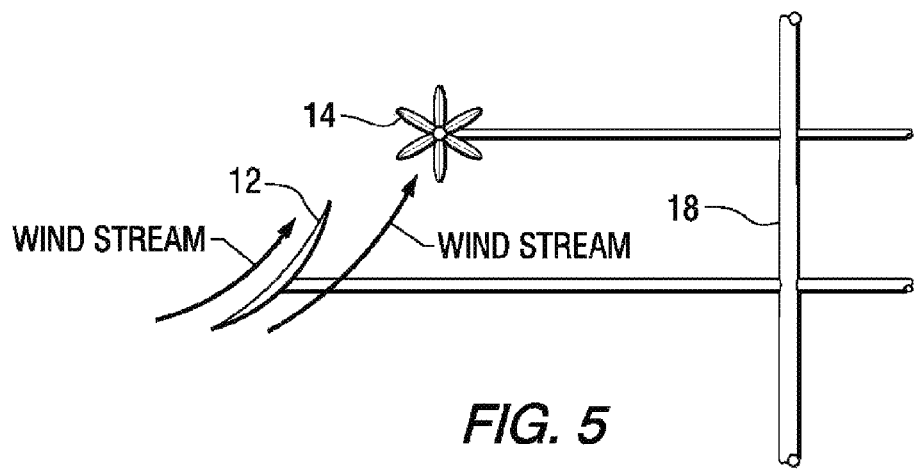
FIG. 5 illustrates a solar collector functioning as an air foil to direct a wind stream toward the wind turbine.

Use of different turbine designs and different turbine blade designs to maximize turbine efficiency and power output depends on the specific installation and orientation details and anticipated wind speeds. Ideally the solar collector 12 incorporates an airfoil-like design, for example comprising a small "wing," to increase the wind speed and direct the wind stream on to the wind turbine blades. The turbine will therefore more efficiently "harvest" the maximum output from the available wind. FIG. 5 illustrates a wind stream, formed by the solar collector 12 and directed toward the wind turbine 14. Flat solar collectors (not illustrated) can also be used, although they may reduce the efficiency of the wind turbines.

Figure 6:
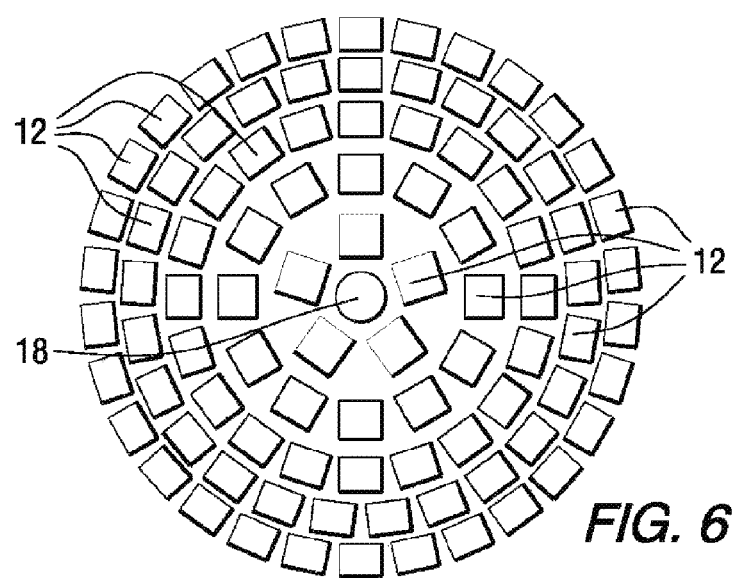
FIG. 6 illustrates a top-down view of the solar/wind tree according to one embodiment of the present invention.

FIG. 6 depicts a top-down view of the solar/wind tree 10/23 for example, showing only the solar collectors 12 and the tree trunk 18.

It is preferable that the overall solar/wind tree design be compatible with installation in a typical neighborhood; the visual design component is therefore important. The overall structure, in one embodiment, is predominantly green in color with dark solar collectors. The overall visual impression is intended to blend nicely and look like, in essence, a unique form of a "tree." One preferable installation includes the yard of a home. Therefore having the "tree" blend with the other vegetation may be important. Artificial foliage (leaves, for example) can also be incorporated into the tree 10/23 to soften its visual appearance and make the solar wind tree more esthetically pleasing.

It is known that cell towers are designed to mimic trees in some locations, especially where zoning ordinances prohibit cell towers that do not blend with the natural vegetation. These same objections may be raised against the solar/wind tree of the embodiments of the present invention. Thus the wind turbines and solar energy collectors may be designed to appear as natural vegetation to the cursory viewer. Additionally, the "tree" may include some artificial leaves, branches and other elements to camouflage the wind turbines and solar collectors and make the tree appear more realistic. The ultimate commercial success of the present invention suggests that "being a good neighbor" (e.g., blending with the natural vegetation) is important.

In one embodiment both the solar collectors and the wind turbines generate DC electricity allowing use of a single power conductor to emerge from the solar wind tree. The DC electricity is converted to 60 Hz AC electricity in an inverter (not shown) for direct use by a consumer or for input to the electrical grid. The inverter and associated controls can be located at the base of "tree" or in a separate proximate structure.

The size of the tree generally determines the overall energy output from the wind turbines 14/24 and the solar collectors 12. Although a large tree(s) might be desirable, zoning codes or neighborhood aesthetics may limit "tree" size. A taller tree provides a higher wind turbine efficiency since the wind speed generally increases as a function of distance from the ground. In one embodiment the wind turbines are installed only on the upper levels of the tree where the wind is more effective in generating usable power. The solar component operates at about the same efficiency irrespective of distance from the ground.

Generally, it is desired that no or few obstructions be placed in the wind path to the wind turbines. For a typical home in Los Angeles that uses approximately 7300 kWh per year, three 21 ft. tall trees may be required. This is calculated by assuming a solar output of about 10 watts/square foot, requiring about 100 square feet of solar collectors for each annual kWh demand. If one assumes the radius of each tree is about seven feet then each tree presents an area of approximately 153 square feet facing the sun. Since about half of the collectors may not be oriented in the optimal sun position, the inventors estimate that the solar collector portion of three trees will provide just over 3 kWh per year with the balance of energy being provided by the wind turbines. This should cover approximately 75% of the power usage of a typical home in the Los Angeles area.

Figure 7:
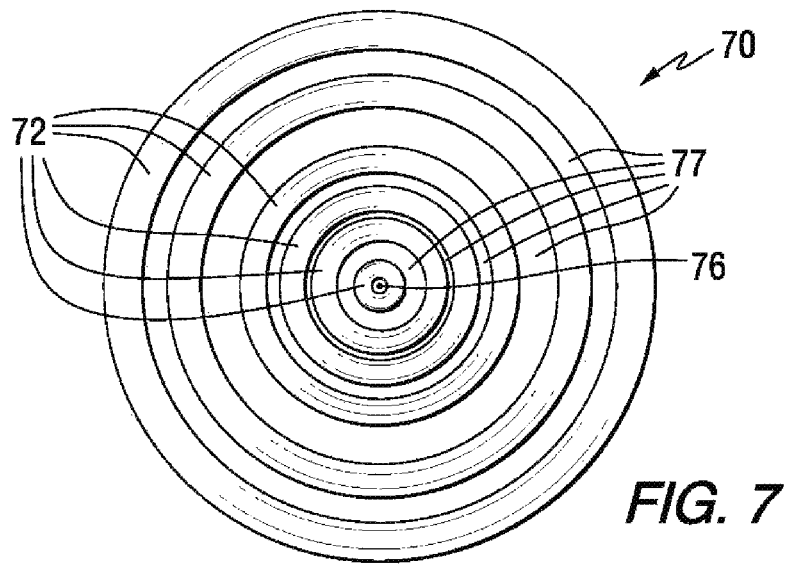
FIG. 7 illustrates a top view of a solar/wind tree according to a different embodiment of the invention.
Figure 8:
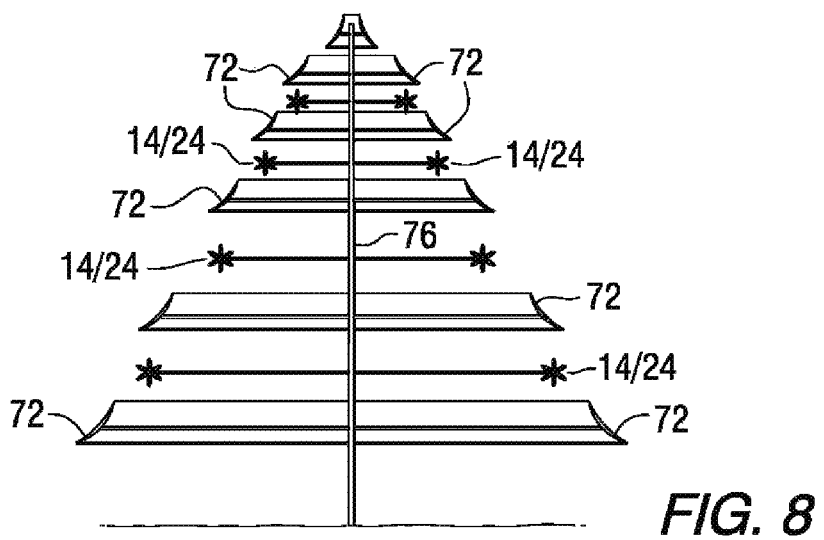
FIG. 8 illustrates a cross-section through the solar/wind tree of FIG. 7.

In another embodiment, a solar/wind tree 70 comprises a plurality of ring-like film solar collectors 72 that encircle a tree trunk 76. See the top-down view of FIG. 7 and the side view of FIG. 8. An open space between each film solar collector is identified by a reference character 77. The solar collectors 72 of this embodiment may be constructed from a solar film in lieu of the rigid solar panels described with reference to other embodiments presented herein. Since the collectors encircle the tree trunk 76, they provide unbroken sun exposure (in the circumferential direction) and thus increased electrical generating capacity. The open space between adjacent solar collectors reduces the electrical generating capacity but may be required to reduce the wind forces exerted on the tree 70 and its constituent elements. As illustrated in FIGS. 7 and 8, the radius of successive solar rings increases from the top to the bottom of the tree 70. Note also in the side view of FIG. 8 the solar film is shown with a slight curvature, which may be convex or concave. In another embodiment the solar film is substantially flat.

The open space between two successive solar rings 72 may also create an area for mounting the wind turbines 14/24 as illustrated in FIG. 8. In one embodiment, a shape of the rings includes a slight camber (as shown in the side view of FIG. 8), operating as a stationary wing or blade to direct and concentrate the wind in a direction toward the wind turbines 14/24. It is expected that the cambered ring of solar collectors will enhance the efficiency of the wind turbines, since each ring is continuous and can therefore direct the wind as it impacts the ring from any direction.

Figure 9:
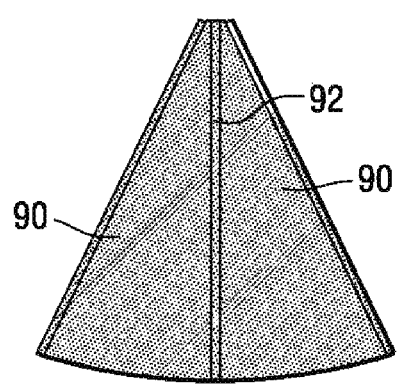
FIG. 9 illustrates a solar power generating device.

In an area with no or a small wind component, the "tree" of the present invention may comprise a solar tree rather than a solar/wind tree. In this case, additional trees may be required to compensate for the lack of wind turbines. Such an embodiment, illustrated in FIG. 9, includes solar film 90 configured into a conical shape about a vertical center line 92. This embodiment may not include the wind turbines and may be preferable for use in regions where insufficient wind is available to productively generate electricity. As can be seen, in this embodiment the solar film (or closely spaced solar collectors) are continuous (or nearly continuous) with no or very narrow open regions between collectors. Although depicted generally in the shape of a tree, this is not necessarily required for operation of the solar collectors. However, configuration in a tree shape may make the solar collectors more aesthetically pleasing and thus make their use in a residential neighborhood acceptable.

In another embodiment, a tree of the present invention features only turbines and no solar collectors, for example, the embodiments of FIGS. 1 and 2 without the solar collectors 12.

Figure 10:
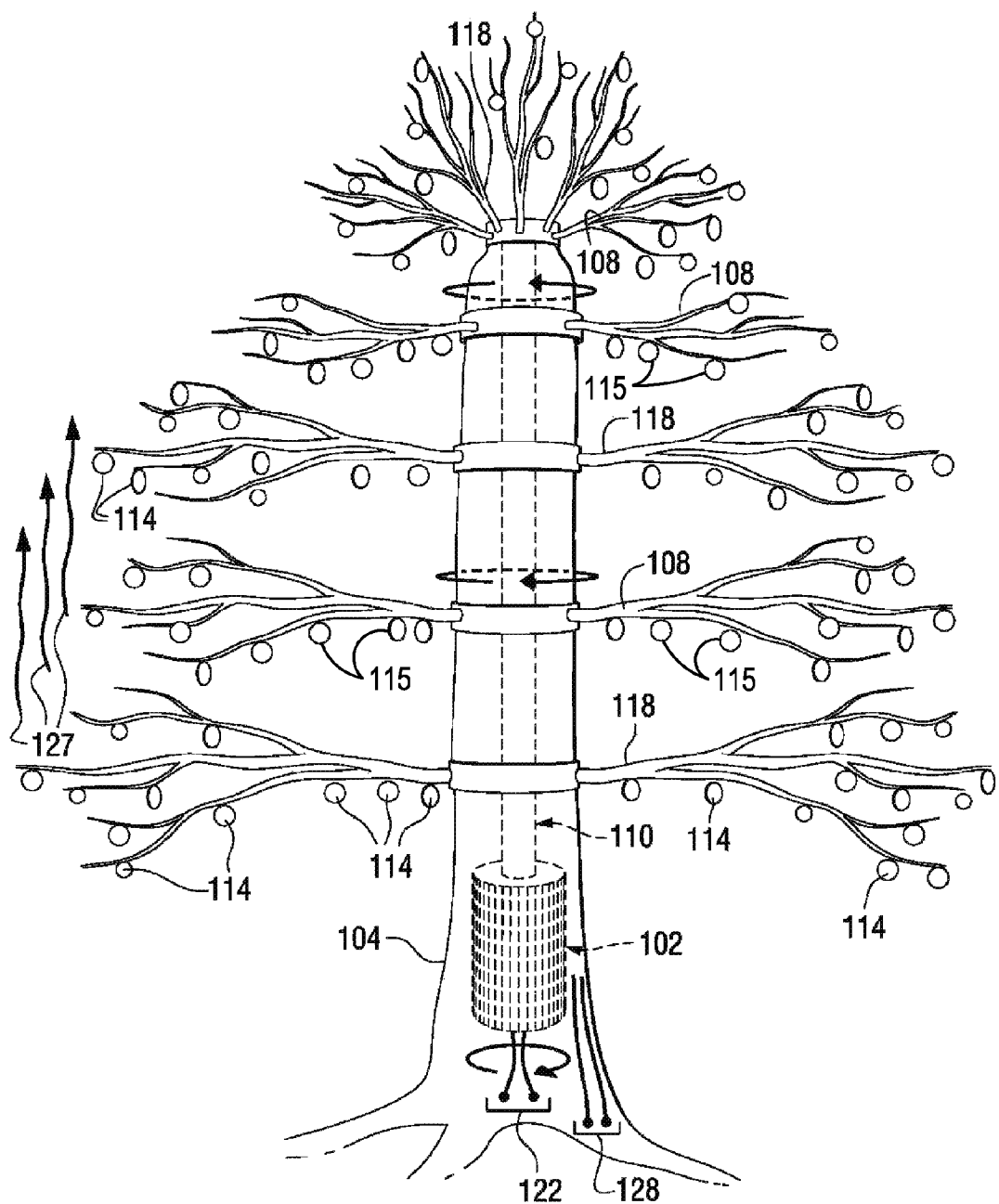
FIGS. 10 and 11 illustrate additional embodiments of solar/wind trees according to the present invention.

Another embodiment of a solar/wind tree 100 is illustrated in FIG. 10. This embodiment includes a generator 102 in a vertical support 104 that is connected to propeller-like rotatable arms 108 via a drive shaft 110. The arms 108 extend radially from the support 104 and comprise elements 114 and other projections that are struck by the wind, causing the arms 108 to rotate. These elements and projections may be configured and oriented to absorb maximum energy from the wind and resemble elements of a live tree. As depicted, the wind-driven arms 108 alternate with fixed solar collector arms 118. Elements 115 affixed to the solar collector arms 118 may comprise solar collectors for generating electricity from sunlight. The arms 108 may be driven to rotate by heated air as it rises (indicated by arrowheads 127) from the base of the tree toward the tree top. Two separate sources of electricity are illustrated, an output from a wind-driven generator over conductors 122 and an output from a solar collector supplied over conductors 128. These may be combined for convenience if permitted by the parameters of the generated electricity.

The various presented embodiments of the solar/wind tree may not offer the most efficient design in generating a maximum amount of solar and wind energy for the homeowner. But the use of several such solar/wind trees on a parcel of property offers a simpler and perhaps a more economical (i.e., lower installation and use costs) apparatus to cover the homeowner's power costs, compared with installing roof mounted solar collectors or installing an unsightly 50-foot tower with a top-mounted wind turbine. Thus the present invention offers a solution that is "about right" when all factors are considered, including the aesthetics of the solar/wind tree and the generating efficiency. To improve the "look" of the tree, it may incorporate artificial leaves and branches (even pine cones in one embodiment) so that the completed structure has the look and feel of a real tree. The solar/wind tree can also be adapted to look like the trees or other vegetation in any particular region of the country.

Figure 11:
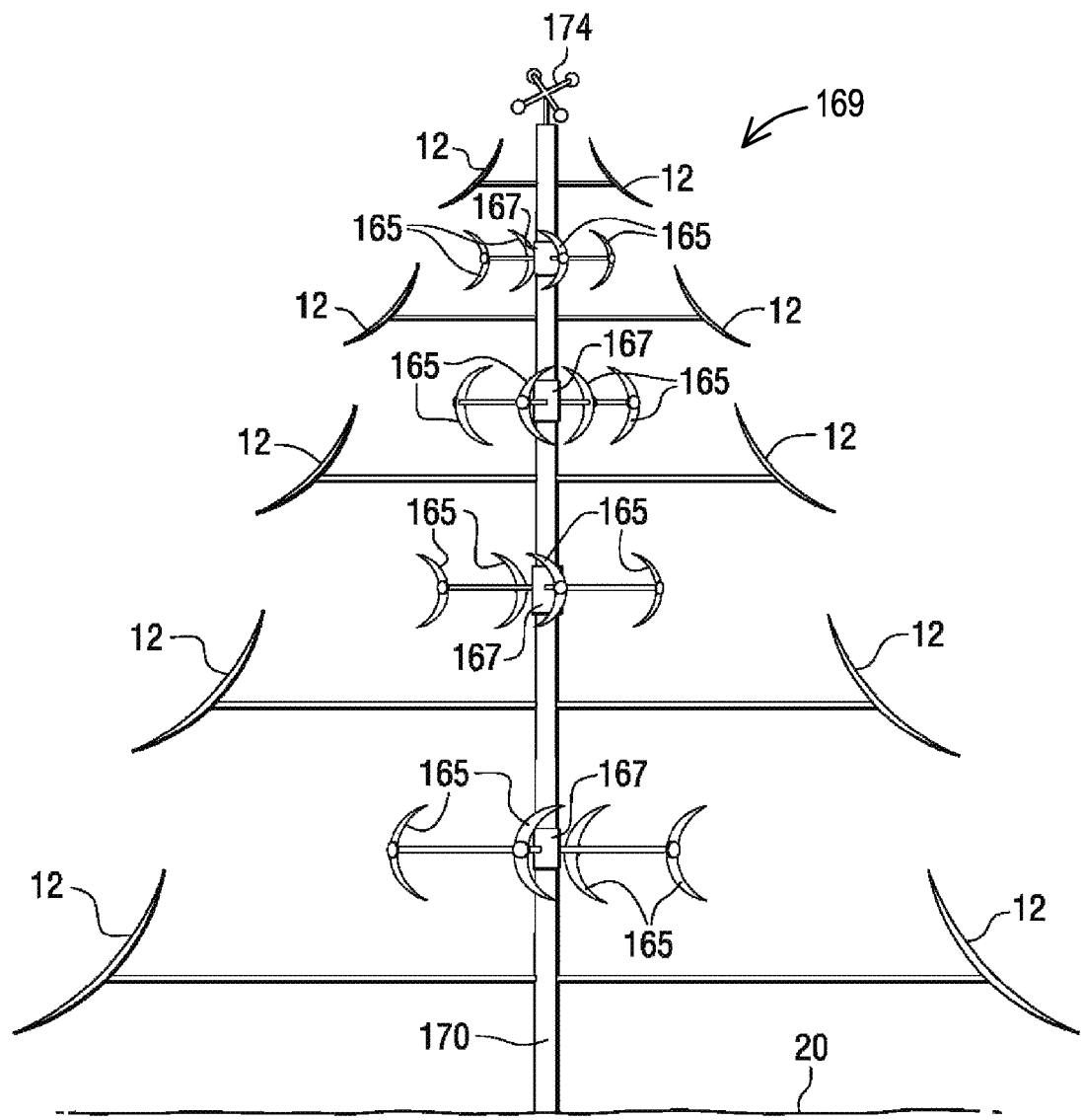

FIG. 11 shows a further embodiment of a solar wind tree 169 having generator windings mounted on a central shaft 170 and the rotational torque, supplied by the wind, causes turbine blades 165 and the connected armature generator windings (not shown) to rotate around stator windings 167 disposed at several different "collar" areas extending from the central shaft 170. In this embodiment the generator elements alternate with the solar collectors 12, leaving adequate space for wind streams to develop above and below the solar collectors 12. An additional embodiment features power generation by induction using magnets at the "collared" areas rather than conventional generator brushes. An anemometer 174 for indicating wind direction and speed is disposed atop the central shaft 170.

Figure 12:
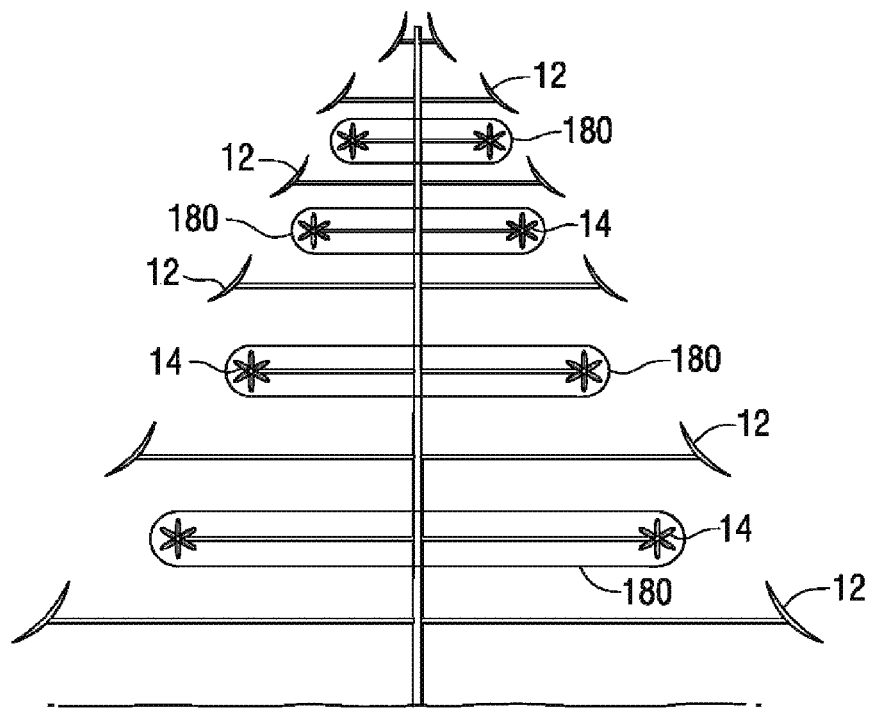
FIG. 12 illustrates an embodiment including protective cages surrounding moving wind turbine elements.
Figure 13:
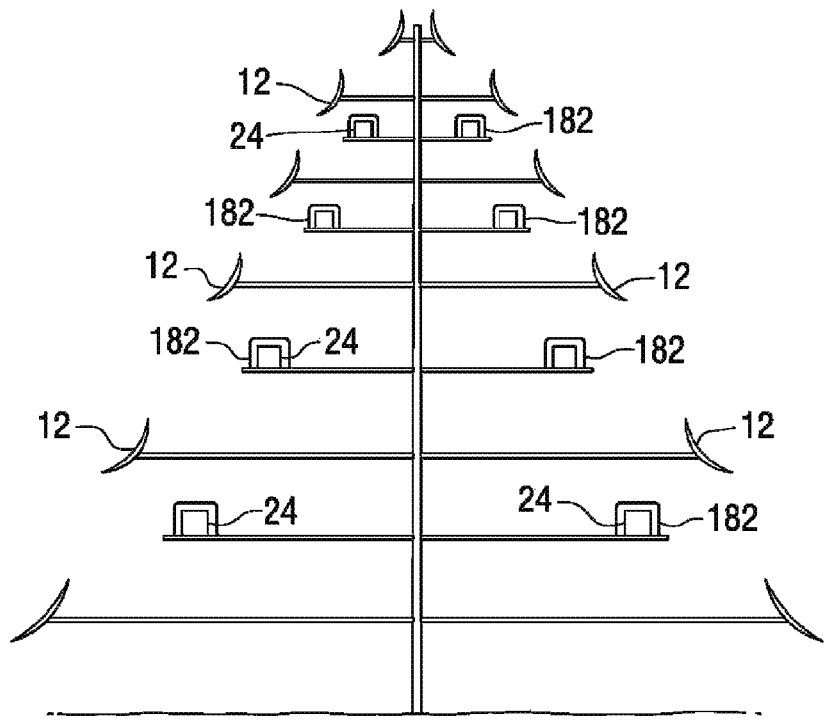
FIG. 13 illustrates an embodiment with vertically oriented wind turbines.

FIGS. 12 and 13 show additional embodiments that feature protective cages 180 and 182 around the moving wind devices so that birds or animals do not contact the moving parts. FIG.

12 applies to the wind turbines illustrated in FIG. 1; FIG. 13 applies to the helical wind turbines illustrated in FIGS. 2 and 16.

Figure 14A:
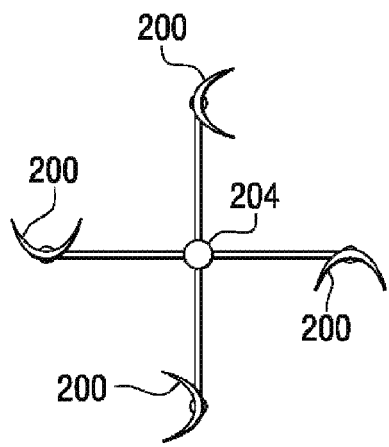
FIGS. 14A and 14B show further embodiments of turbine blades for use with a solar/wind tree of the present invention.
Figure 14B:
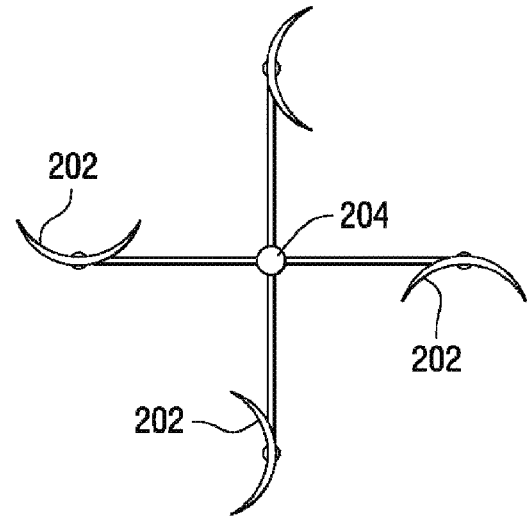

FIGS. 14A and 14B show further embodiments of respective cups 200 and 202 that drive a central shaft 204, for use in lieu of shaped turbine blades. The cups 200 and 202 alternate with the solar collectors 12, as depicted in several figures of the present application, to maximize both wind driven and solar driven energy.

Figure 15:
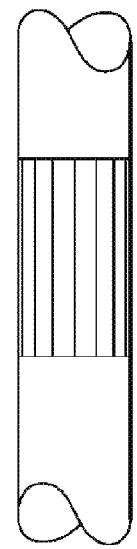
FIG. 15 illustrates a vertically mounted generator winding for use with the present invention.

FIG. 15 illustrates vertically-mounted generator stator windings that are mounted to or disposed around the support shaft or trunk of any of the presented embodiments. Electricity is generated in the vertical windings by interaction with the magnetic field produced by the armature windings.

Figure 17:
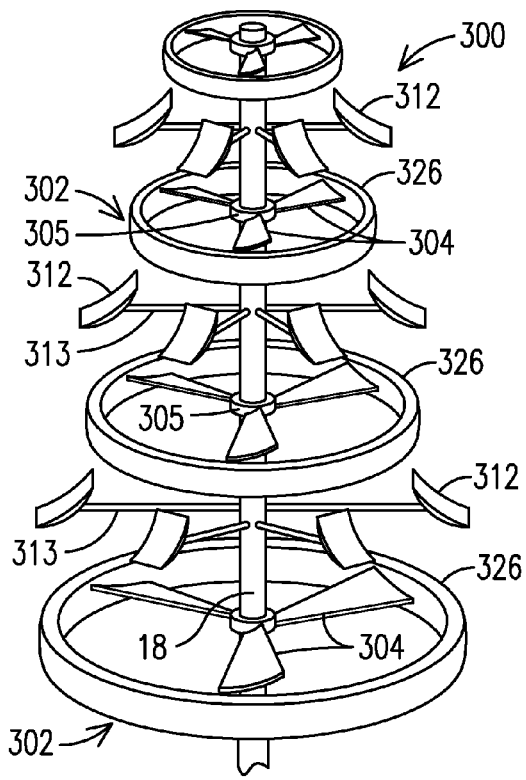
FIGS. 17-19 each illustrate a solar wind tree having horizontally disposed wind turbines and solar panels.

According to another embodiment of the invention, as depicted in FIG. 17, a solar wind apparatus 300 (in the shape of a tree in a preferred embodiment) comprises a plurality of wind turbines 302, each having constituent blades 304 connected at a hub 305 that are disposed horizontally or at about a 90 degree angle to the supporting "trunk" or the vertical post 18. As in the prior embodiments, solar collectors 312 (concave solar panels in FIG. 17 for example) direct wind toward the wind turbines 302, the wind striking the blades 304 and causing the blades to turn (i.e., the hub 305 rotating about the vertical post 18), which generates electricity by generator action, as in the embodiments described above. The solar collectors 312 do not rotate about the vertical shaft 18.

According to this embodiment, electricity generating components (e.g., stator, rotor, etc.) present in both the hub 305 and proximate regions of the vertical shaft 18 interact to generate electricity.

Although the illustrated embodiment depicts three blades 304 within each wind turbine 302, each wind turbine 302 can comprise any number of blades 304. Also, any number of wind turbines 302 (three illustrated in FIG. 17) can be placed along the vertical shaft 18 of the solar wind apparatus 300. Further, the wind turbines can be mounted parallel to the vertical shaft 18 in addition to the perpendicular mounting illustrated in FIG. 17. Also, although four solar collectors 312 are depicted attached to each arm 313, (and those solar collectors 312 are all located in a foreground region of FIGS. 17-19) this number and their location were chosen to avoid cluttering FIGS. 17-19. Those skilled in the art recognize that any number of solar collectors 312 can be attached to each arm 313 and the collectors can be distributed at any point on an imaginary circle concentric with the vertical shaft 18.

To generate electricity most efficiently, the number, location, and size of the wind turbines 302, the number, shape and size of blades 304, and the number and location of the solar collectors 312 are determined after analysis of the site wind and solar conditions, including expected wind direction and velocity.

The solar wind apparatus 300 can be of conventional design (i.e., the blades are connected to the shaft 18 (or to a plurality of such shafts)) that cause the generator to turn, with the generator installed either proximate the wind turbine 302 or at a base of the solar/wind tree 300. In one embodiment the generator comprises a gearless blade tip power system available from Honeywell International of Morristown, N.J. as described below. In another embodiment a helical wind turbine as depicted in FIG. 16 can be used.

In yet another embodiment stator windings (not shown) are disposed within rings 326 disposed beyond the circumference of the blades 304. The rings are affixed to the shaft 18 by support components not illustrated, such as support ribs having a first end extending downwardly and at an angle from a bottom surface of each ring 326 and a second end affixed to the shaft 18. In this embodiment permanent or electromagnets are installed at a tip of each blade 304. Current is generated in the stator windings as the blades 304 are turned by the wind energy.

Figure 18:
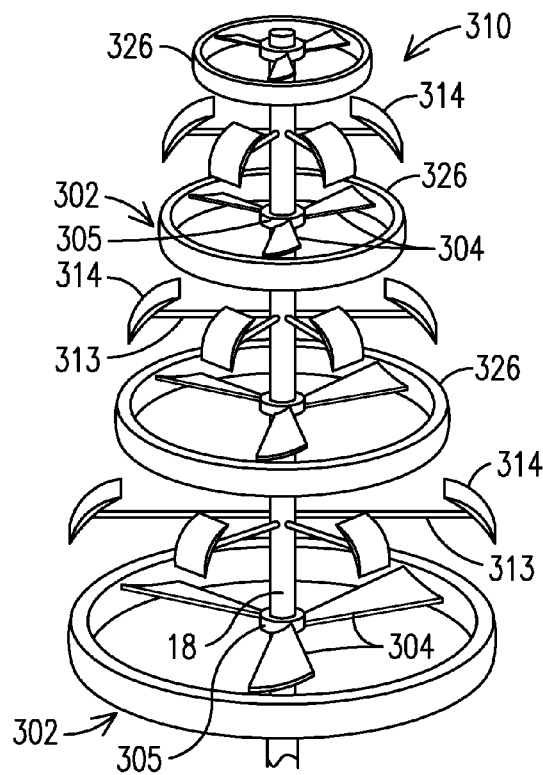

FIG. 18 illustrates a solar wind apparatus 310 having convex solar panels 314 fixedly attached to the vertical post 18.

Figure 19:
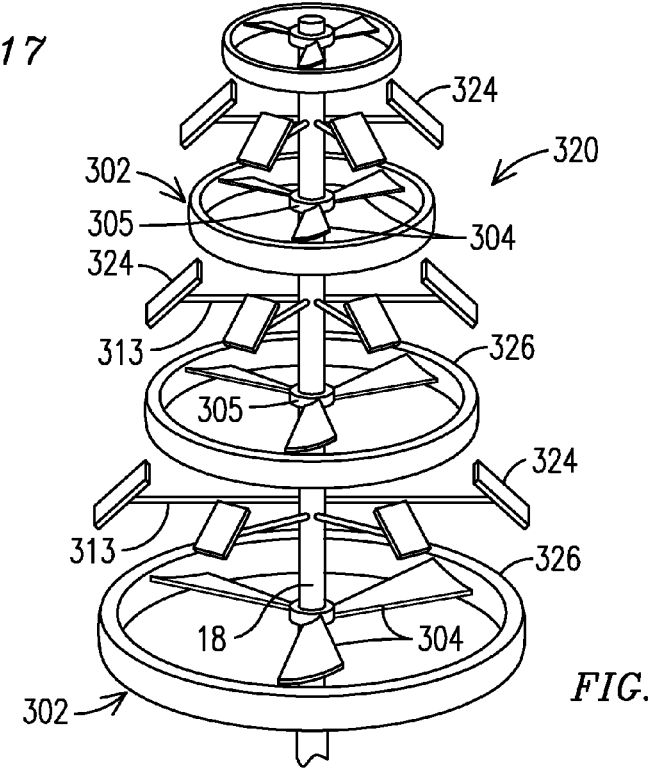

FIG. 19 illustrates a solar wind apparatus 320 having flat solar panels 324 fixedly attached to the vertical post 18.

A gearless blade tip power system available from Honeywell International of Morristown, N.J. is one type of wind turbine that can be used with certain embodiments of the present invention. This wind turbine utilizes a system of magnets and stators disposed on an outer ring, thereby capturing power at the blade tips. Rather than forcing the wind to turn a generator, the perimeter power system becomes the generator by passing blade tip magnets through copper coil banks mounted onto a perimeter frame.

Figure 20:
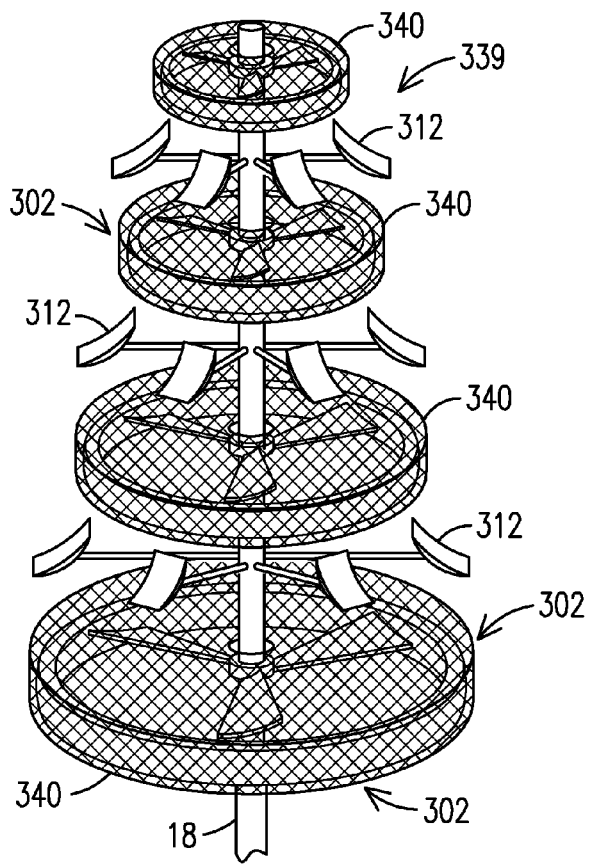
FIG. 20 illustrates a solar wind tree including a protective cage surrounding the moving wind turbine blades.

Regardless of the selected generator, one embodiment 339 employs a cage or wire mesh 340 surrounding the wind turbine 300 to protect birds and small animals from the spinning blades. See FIG. 20.

The solar collectors in any of the presented embodiments that direct the wind stream onto the wind turbine blades can be concave, convex, or flat, and with variable dimensions as appropriate to maximize wind velocity impinging the wind turbines. For example, the collectors can have a larger dimension along an edge of a surface nearer the base of the tree. Again, the ideal shape is determined by wind conditions at the site of the solar/wind tree.

Figure 21:
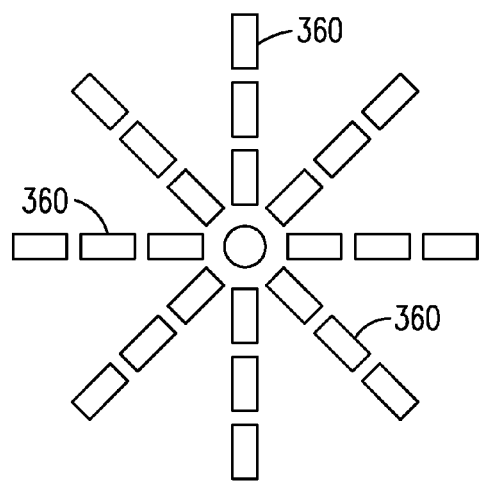
FIGS. 21 and 22 illustrate differently shaped solar panels for use in the various embodiments of the present invention.
Figure 22:
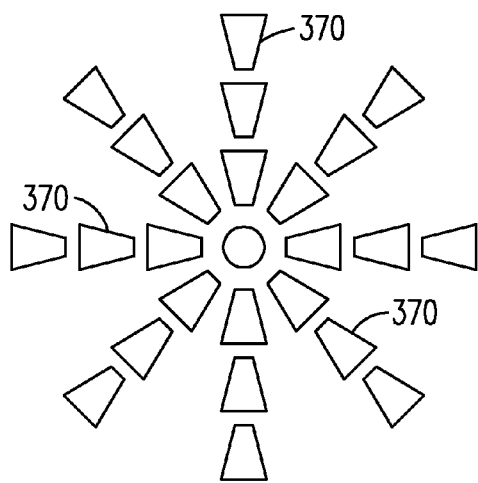

FIGS. 21 and 22 are top views illustrating, respectively, rectangular solar panels 360 and trapezoidal or wedge-shaped solar panels 370.

It is expected that there may be a cumulative effect as the wind passes through several levels of wind turbines as depicted in the various figures. In effect, the wind directed upwardly from lower levels adds to the wind directed toward upper level wind turbines, thereby having a positive effect on the efficiency of the solar/wind power generating apparatus. The air stream enters the solar/wind turbine at a relatively low pressure and exiting at a higher pressure. Again, shaping of the solar collectors for optimum wind flow must consider trade-offs between efficiency for proximate and distance wind turbines.

A solar wind apparatus according to one embodiment may be open at the top or apex to allow wind to exit the solar wind tree without restriction to improve the efficiency of the wind tree.

Figure 23:
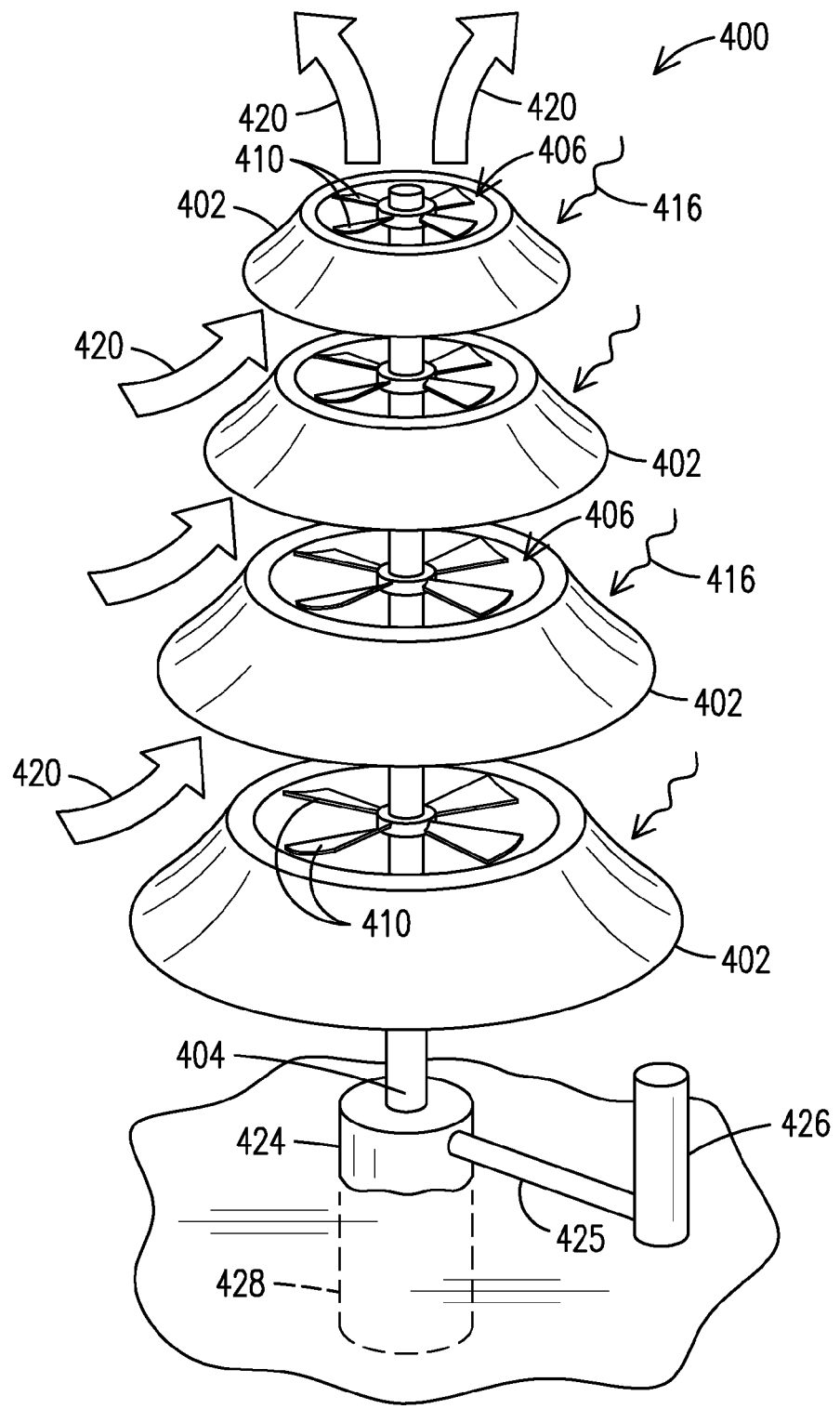
FIG. 23-26 illustrate additional embodiments of solar wind trees according to the present invention.

FIG. 23 depicts yet another embodiment of an apparatus 400 for generating electricity from solar and wind resources. The apparatus 400 comprises solar collecting skirts 402 extending outwardly from a central vertical shaft or armature 404. Wind turbines 406 also extend outwardly from the armature 404 and each comprises a plurality of turbine blades 410. Solar energy is indicated by curved inwardly-directed arrowheads 416 and wind streams by double inwardly-directed arrowheads 420. A generator 424 generates electricity from the rotational energy supplied by the wind turbines 406 through rotation of the armature 404 by the wind turbine blades 410. A conductor 425 extends from the generator 424 to an inverter or other electronics components 426. A foundation 428 for supporting the device 400 is also illustrated.

As in the various embodiments described herein, the wind streams 420 cause the turbine blades 410 to rotate and thereby generate electricity in the generator 424. The solar energy collecting skirts 402 generate electricity from the sun's radiant energy impinging the skirts 402 from any direction.

As air entering the apparatus 400 rises (increasing pressure and velocity) through inside surfaces of the solar collecting skirts 402, it is heated as it contacts these surfaces. This "chimney effect" causes additional energy to be generated by the wind turbines 406 in cooperation with the generator 424.

As in the other described embodiments, a pitch of the turbine blades 410 can be controlled to extract maximum energy from the wind stream. Also, although the wind turbines 406 are depicted as situated at a top surface of each of the solar collecting skirts 402, this is not required as the wind turbines 406 can be positioned at different distances along the vertical height of the skirts 402 or between two skirts 402 as dictated by local wind and solar energy conditions and as desired for efficient operation.

Figure 24:
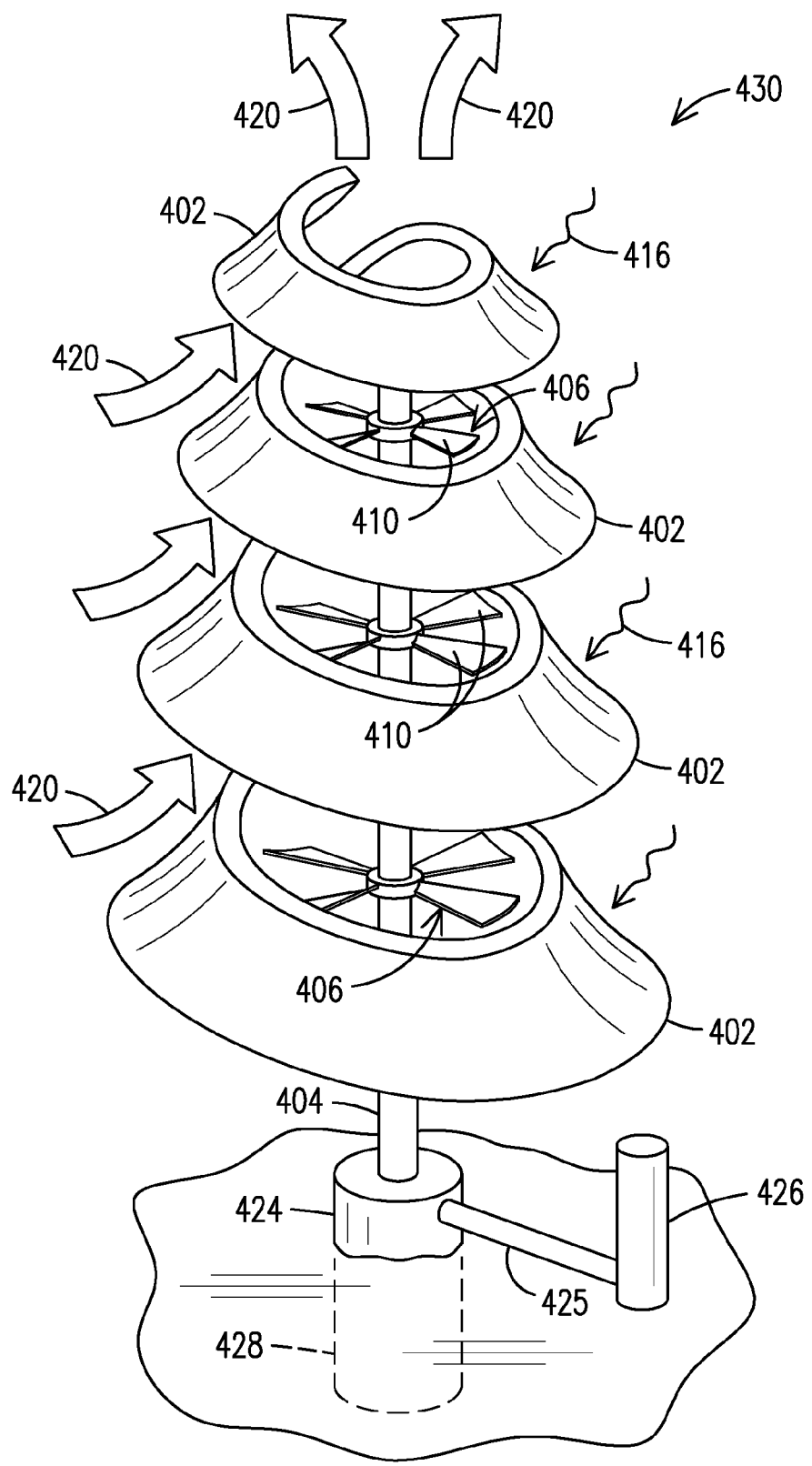

FIG. 24 illustrates a solar energy collector and wind turbine generator 430 comprising a twisted or spiral-shaped flexible solar energy collector 434, which may be advantageous in directing the wind energy toward the wind turbines 406. In particular, the spiral shaped collector 434 creates an updraft wind vortex to turn the wind turbines 406. The spiral-shaped collector 434 can have a concave, convex, or flat cross-sectional shape.

Figure 25:
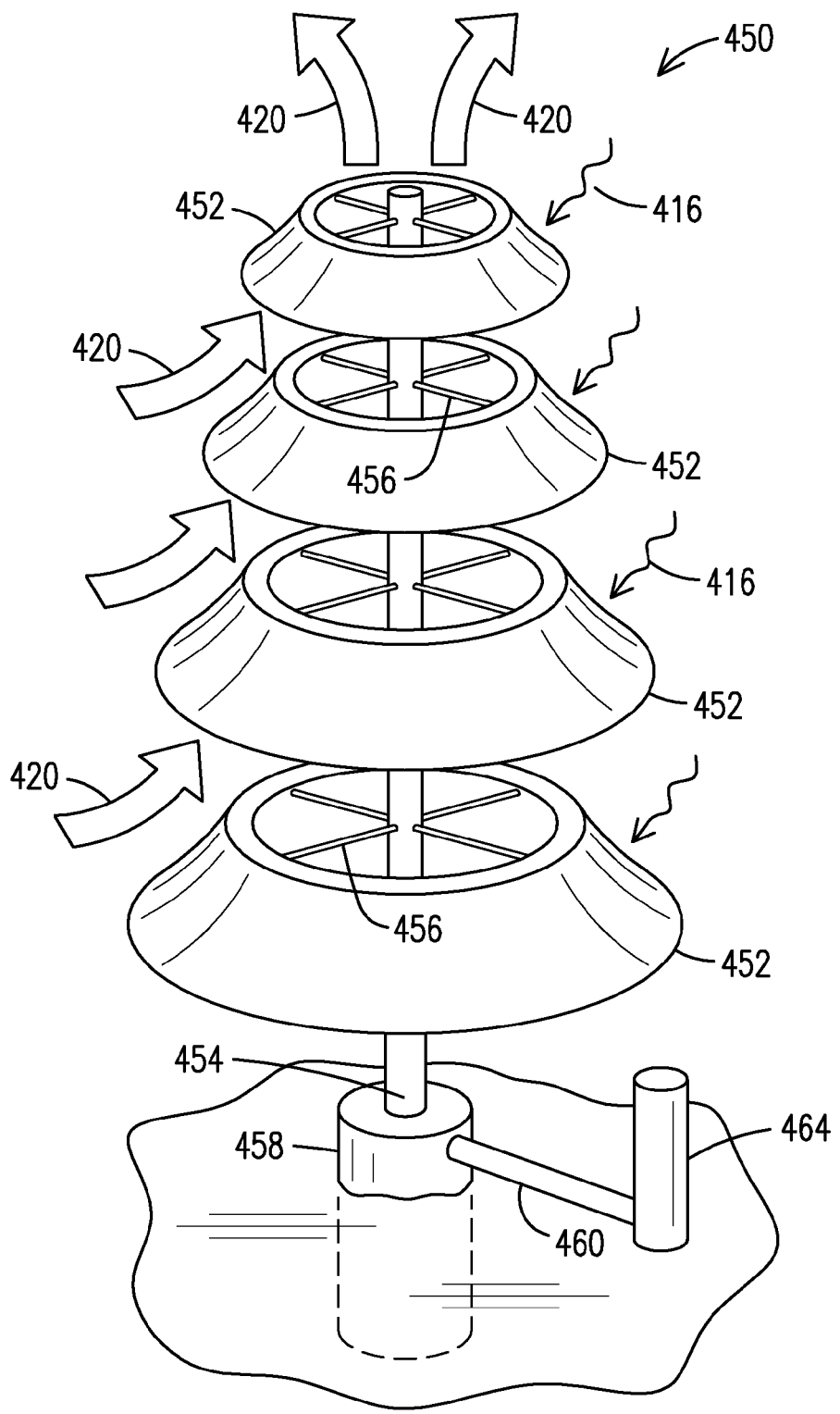

FIG. 25 illustrates a solar energy collecting apparatus 450 comprising a plurality of solar energy collectors 452 connected to a central shaft 454 through struts 456. The apparatus 450 is anchored into the ground with a foundation 458. Electricity generated by the apparatus 450 is conducted over a conductor 460 to an inverter or other electronics components 464. Note that the apparatus 450 does not include a wind turbine generating apparatus. This embodiment may be suitable for use where low energy consumption is warranted. But when formed in a tree-like shape as illustrated, the apparatus 450 will be aesthetically pleasing.

The various embodiments described herein are expected to maximize the energy generated for a given footprint, since both solar and wind energy are harvested from the same device in certain of the embodiments.

Associated devices for metering and/or energy storage can be located at the base of the solar wind tree or separately.

The vertical shaft (such as reference numeral 18 in FIG. 1) in any of the presented embodiments can be telescoped in either direction to increase/decrease the height of the solar/wind generating device and also increase/decrease a distance between the levels of the device (such as the arms 15 in FIG. 1). Thus the telescoping feature provides another mechanism for optimizing the generation of electricity from the solar/wind generating apparatus. Additionally, the telescoping feature permits rotation of one vertical segment of the device relative to another vertical segment of the device. This rotational feature may be especially beneficial to optimize solar energy striking the solar panels.

The various illustrated embodiments may comprise elements (leaves, bark, branches, stems, trunks) that are intended to camouflage the solar energy collectors and the wind turbines and their associated devices. The color, surface texture, size, and appearance of the solar energy collectors, the wind turbines and their associated devices may be selected to appear as vegetation. In FIG. 10, for example, the elements 114 appear to be leaves, the vertical support 104 appears to be a tree trunk and the arms 108 and 118 appear to be tree branches.

A solar/wind tree "farm" or "grove" comprises multiple, relatively closely spaced, solar/wind trees. In a commercial solar/wind tree farm the aesthetic elements may be minimized in an effort to generate the maximum amount of wind and solar energy available at the site. The solar/wind trees are spaced so that the maximum wind and solar energy is gathered at each solar/wind tree.

Many of the described embodiments include both solar panels and wind turbines. However, this is not required as the inventive features can be applied separately to create a solar tree for generating electricity from solar energy and a wind tree for generating electricity from wind energy. In either case, the "tree" can include vegetation that camouflages the solar panels and/or wind turbines and makes the "tree" appear more realistic. In yet another embodiment, the arrangement of solar panels and/or wind turbines may be oriented in a shape that does not resemble a tree.

Many of the presented embodiments have been illustrated as having a conical tree shape such as a pine tree. When camouflaged to resemble any large plant species, including in both shape and size, these embodiments tend to be aesthetically pleasing. However, this feature is not intended to limit the scope of the present invention nor is it intended to be present in all embodiments. Instead, all wind turbines along the vertical can be the same size and shape and in yet another embodiment the wind turbines can be inverted from the illustrated configurations, i.e., the uppermost wind turbine having a larger diameter than the lowermost wind turbine.

Also, it is not necessary to alternate the solar collectors and the wind turbines, although it may be preferable to arrange the collectors and turbines in a conical shape so that upper solar collectors do not shield lower solar collectors from the solar energy. Those skilled in the art of generators and wind turbines recognize that any of several different generator types (and coil windings) may be used in conjunction with the wind turbine to generate electricity. Any of these generator and winding types are within the scope of the present invention.

In certain of the embodiments vegetation elements are not shown in the respective figure(s). However elements can be added, such as illustrated in FIG. 10, to camouflage the solar collectors and wind turbines so that the structure resembles a tree or another form of vegetation.

Figure 26:
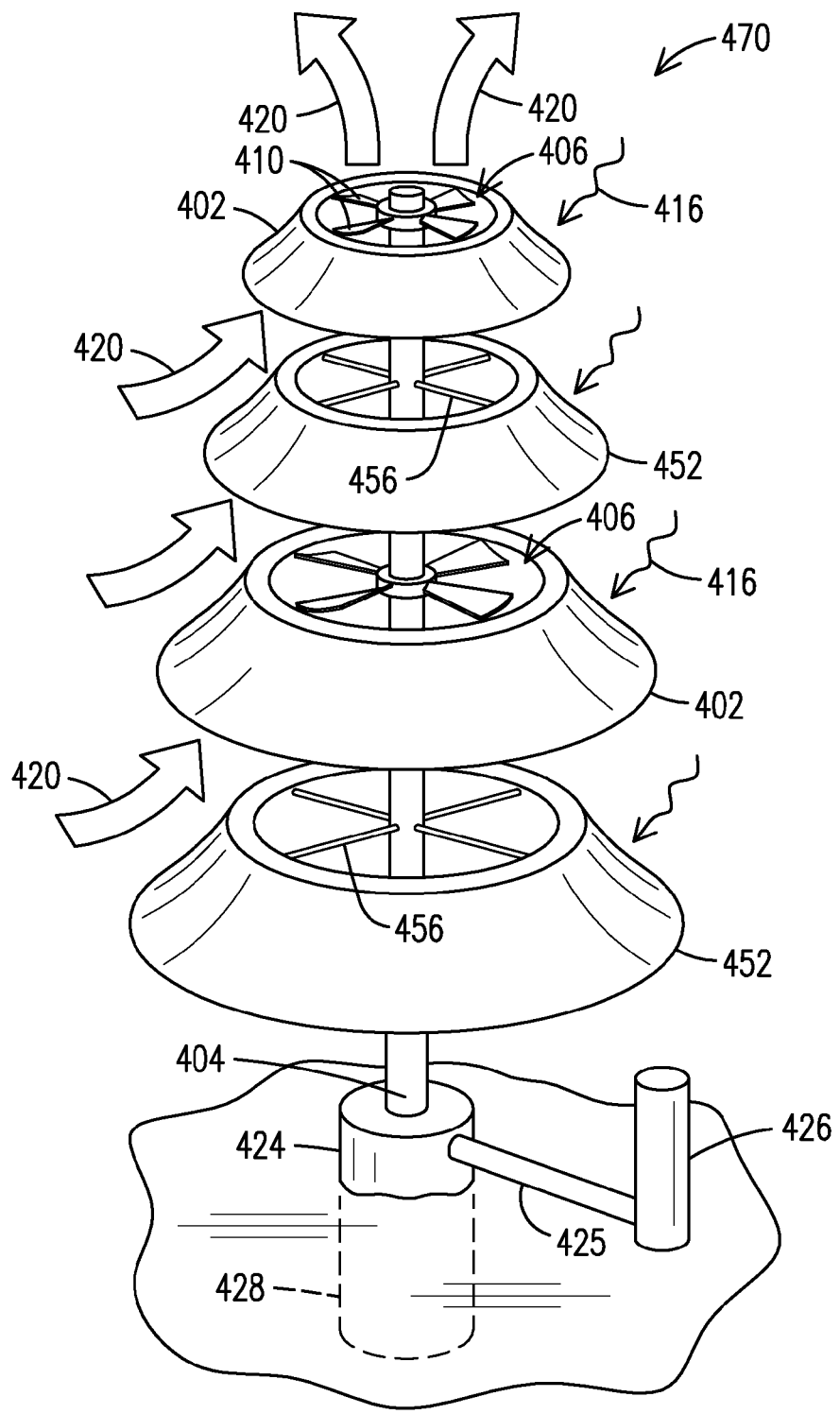

FIG. 26 illustrates a solar and wind energy collecting apparatus 470 comprising the solar energy collecting skirts 402 encircling wind turbines 406 (see also FIG. 23) plus solar energy collectors 452 (see also FIG. 25) that alternate with the solar energy collecting skirts/wind turbines 402/406.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for generating electricity, comprising:
   a plurality of solar energy collectors for generating electricity from solar energy;
   a plurality of wind turbines for generating electricity from wind energy;
   a support structure comprising first arms and second arms extending radially from a vertical shaft, the first and second arms positioned at different vertical locations along the vertical shaft and having decreasing lengths in a direction toward a to of the support structure;

each one of the solar energy collectors affixed proximate a terminal end of one of the first arms and shaped and oriented to direct wind streams striking the solar energy collector toward one of the wind turbines;

each one of the wind turbines comprising an element affixed proximate a terminal end of one of the second arms and responsive to wind streams for rotating the element and the second arm to generate electricity; and wherein the first arms alternate with the second arms.

2. The apparatus of claim 1 the support structure comprising camouflage elements causing the support structure to resemble vegetation further comprising a tree trunk, tree branches and tree foliage.

3. The apparatus of claim 1 wherein the plurality of solar energy collectors comprises a continuous band of solar energy film having a first end proximate a bottom region of the support structure and a second end proximate a top region of the support structure, the continuous band affixed proximate terminal ends of the first arms between the first end and the second end.

4. The apparatus of claim 1 wherein the plurality of solar energy collectors comprise one or more concave, convex and flat solar energy collectors.

5. The apparatus of claim 1 further comprising a first electricity generating component disposed on the vertical shaft interacting with a second electricity generating component disposed in the vertical shaft, interaction of the first and second electricity generating components generating electricity in the second electricity generating component.

6. The apparatus of claim 1 wherein rotation of the element and the second arm causes rotation of a vertical drive shaft disposed in the vertical support, and wherein rotation of the vertical drive shaft causes rotation of a generator disposed at a base of the vertical support for generating electricity.

7. The apparatus of claim 1 wherein the support structure comprises a support structure in a conical shape.

8. The apparatus of claim 1 wherein an orientation of at least one of the plurality of solar energy collectors is adjustable responsive to a direction of solar energy impinging the solar energy collectors, and at least one of the elements is adjustable responsive to a direction of wind streams impinging the elements.

9. The apparatus of claim 1 further comprising a cage surrounding each one of the plurality of second arms.

10. The apparatus of claim 1 wherein each one of the plurality of solar collectors comprises a rectangular or a trapezoidal solar collector.

11. An apparatus for generating electricity, comprising:
a vertical shaft;
a ring-like solar energy collecting film centered about the vertical shaft for generating electricity from solar energy;
a plurality of wind turbines centered about the vertical shaft for generating electricity from wind energy, one of the wind turbines encircled by the ring-like solar energy collecting film;
the solar energy collecting film shaped and oriented to direct wind streams striking the solar energy collecting film toward the wind turbines;
each one of the plurality of wind turbines disposed at a different vertical distance along the vertical shaft, rotation of the wind turbines generating electricity;
a first plurality of ring-like collecting films equal in number to the plurality of wind turbines, each one of the first plurality of ring-like collecting films surrounding one of the plurality of wind turbines; and
a second plurality of ring-like collecting films wherein the second plurality of ring-like collecting films do not encircle one of the plurality of wind turbines, the second plurality of ring-like collecting films disposed along the vertical shaft in alternating configuration with the plurality of wind turbines.

12. The apparatus of claim 11 wherein the ring-like solar energy collecting film comprises one of a concave, convex and flat cross-sectional shape.

13. The apparatus of claim 11 each one of the plurality of wind turbines comprises a plurality of blades, a blade pitch adjustable responsive to a direction of wind energy impinging the blades.

14. The apparatus of claim 11 wherein the ring-like solar energy collecting film comprises a single continuous spiral film having a first end proximate a bottom of the vertical shaft and a second end proximate a top of the vertical shaft.

* * * * *